United States Patent [19]

Worner et al.

[11] Patent Number: 4,846,759

[45] Date of Patent: * Jul. 11, 1989

[54] DEVICE FOR REDUCING ENGINE-EXCITED VIBRATIONS OF A DRIVE TRAIN, ESPECIALLY A SPLIT FLYWHEEL

[75] Inventors: Gunter Worner; Franz Moser, both of Kernen; Ernest Tscheplak, Weinstadt, all of Fed. Rep. of Germany

[73] Assignee: Daimler-Benz Aktiengesellschaft, Stuttgart, Fed. Rep. of Germany

[ * ] Notice: The portion of the term of this patent subsequent to Feb. 16, 2005 has been disclaimed.

[21] Appl. No.: 21,678

[22] Filed: Mar. 4, 1987

[30] Foreign Application Priority Data

Mar. 19, 1986 [DE] Fed. Rep. of Germany ....... 3609149

[51] Int. Cl.$^4$ .......................... F16D 3/14; F16F 15/12
[52] U.S. Cl. ...................................... 464/68; 74/574; 192/106.2; 464/63
[58] Field of Search ............ 74/574; 192/106.1, 106.2; 464/63, 64, 66, 68

[56] References Cited

U.S. PATENT DOCUMENTS 4,662,239  5/1987  Wörner et al. .................. 464/68 X

FOREIGN PATENT DOCUMENTS 3505069  2/1986  Fed. Rep. of Germany ... 192/106.2
2153970  8/1985  United Kingdom ............ 192/106.2
2160296  12/1985  United Kingdom .................. 464/64

Primary Examiner—Daniel P. Stodola
Attorney, Agent, or Firm—Barnes & Thornburg

[57] ABSTRACT

The flywheel elements are connected to one another in drive terms via a spring mounting, an abutment of which is movable relative to the associated flywheel element against the resistance of a second spring mounting and a non-positive coupling arranged parallel to the second spring mounting. Furthermore, a second non-positive coupling, subject to play, is connected between the flywheel elements and is limited resiliently in at least one direction.

9 Claims, 4 Drawing Sheets

DEVICE FOR REDUCING ENGINE-EXCITED VIBRATIONS OF A DRIVE TRAIN, ESPECIALLY A SPLIT FLYWHEEL

BACKGROUND AND SUMMARY OF THE INVENTION

The invention relates to a device for reducing engine-excited vibrations of a drive train, especially a split flywheel, having two device or flywheel elements which are arranged equiaxially relative to one another and one of which is connected or connectable to the engine and the other to the drive train. A spring mounting 18 drivingly connects the device or flywheel elements to one another and is connected to at least a first flywheel element via a first non-positive coupling inserted between an abutment part of the spring mounting and the first flywheel element. A second non-positive coupling, subject to play, is inserted in parallel to the spring mounting between the two flywheel elements, preferably with a non-positive connection reduced in comparison with the first coupling.

A corresponding flywheel is shown in the U.S. patent applicant Ser. No. 829,508, filed Feb. 14, 1986. In this, the masses of the flywheel elements and the forces of the spring mounting are calculated so that, under driving conditions, the vibrations excited by the engine have a frequency in the so-called super critical range, that is to say far above the resonant frequency of the split flywheel. Furthermore, the play of the preferably provided coupling subject to play is made sufficiently large so that, as a rule, it is not used up.

The coupling subject to play and/or the first coupling, which is inserted between the abutment part of the spring mounting and the first device or flywheel element and which, in the arrangement according to the U.S. patent application Ser. No. 829,508, will as a rule have a non-positive connection exceeding the maximum torque of the engine, are only activated in special situations. For example, the situations include when driving suddenly changes from deceleration to acceleration or from acceleration to deceleration, of when, for example during the starting of the engine, the resonant frequency of the split flywheel is excited. In this case, the said couplings act as non-positive connections between the flywheel elements and effectively brake the relative movements between the flywheel elements.

In the split flywheel described in the U.S. patent application Ser. No. 829,508, the abutment part connected to the first flywheel part, via the first coupling, can rotate to any extent in principle against the resistance of the said coupling, so that the torque which can be transmitted between the flywheel elements is limited correspondingly.

U.S. patent application Ser. No. 764,648, filed Aug. 12, 1985, now U.S. Pat. No. 4,662,239 shows a split flywheel, in which the flywheel elements are coupled in drive terms by means of a spring mounting which is supported directly on the flywheel elements or on abutments fixed to these. Arranged parallel to the spring mounting is a stop spring mounting which takes effect only after a movement play between the flywheel elements have been used up. Arranged parallel to the stop spring mounting is at least one coupling which likewise takes effect only after a movement play between the flywheel elements has been used up. In this known arrangement, shocks detrimental to comfort can occur under certain circumstances, when the torques exerted between the flywheel elements, although so high that the play available to the coupling is used up, are nevertheless insufficient to overcome the resistance generated by the activated coupling.

The object of the invention is to provide a constructive alternative to the device mentioned in the introduction, in which the rotatability of the abutment part relative to one of the devices or flywheel elements is limited, without detriment to comfort, especially in the resonant range of the device.

This object is achieved because a further spring mounting is arranged parallel to the first coupling.

As a result of the further spring mounting, which is arranged parallel to the first coupling and which forces the abutment part in the peripheral direction into the region of a center position in relation to the associated device or flywheel part, the non-positive connection of the first coupling can be made relatively slight. This is because the further spring mounting, increasingly tensioned in response to an increasing deflection of the abutment part in relation to the associated device or flywheel part, can, together with the first coupling which seeks to brake the relative movements between the abutment part and the associated device or flywheel part, also absorb high impact moments. On the one hand, the relatively "soft" suspension of the abutment part, which is thereby possible, results in improved comfort, and on the other hand excessively high vibration amplitudes are effectively limited as a result of the interaction of the further spring mounting with the damping caused by the first coupling. In practice, the described effect occurs only during pronounced load alternation between deceleration and acceleration or during the starting of the engine, when, especially during several attempts to start it in quick succession, the resonant frequency of the system is excited for a longer period. As a rule, under all the remaining operating conditions, only the other first-mentioned spring mounting takes effect, together with the coupling subject to play.

Preferably, the first coupling and the spring mounting parallel to it are such that the non-positive connection of the coupling is lower than the maximum engine torque, and the tension of the spring mounting reaches a value corresponding to the maximum of engine torque only after the spring excursion has been partially used up. In this design, as is desirable for a high degree of comfort, the abutment part can yield even under relatively moderate torques taking effect between the device or flywheel elements. On the other hand, impacts exerted on the abutment part are absorbed over a relatively short distance and damped by the spring mounting tensioned increasingly at the same time and by the resistance which the non-positive connection of the first coupling offers to a relative movement between the abutment part and the associated device or flywheel part.

As a rule, the spring mounting parallel to the first coupling is arranged without prestress.

However, it is also possible to have an arrangement with prestress, although this should preferably be lower than the maximum engine torque, so that the abutment part can rotate relative to the associated device or flywheel part even under lower torques.

According to an embodiment of the invention preferred from the point of view of construction, annular discs or annular segments are arranged between the device or flywheel elements on one of the elements in two radial planes located at an axial distance from one another and have apertures which approximately coincide in the discs or segments in an axial view and extend tangentially relative to the disc axis. The apertures receive, in a cage-like manner, the helical compression springs arranged tangentially between the annular discs or annular segments. A further annular disc is arranged axially as an abutment part between the discs or segments, is rotatable relative to the two above mentioned annular discs or annular segments and has cut-outs which surround the end faces of the helical springs.

As a rule, the edges of the cut-outs surrounding the end faces of the helical springs are, in the peripheral direction of the annular discs forming the abutment part, at a distance from one another corresponding to the length of the apertures in the adjacent annular discs or annular segments. Thus, the helical compression springs support free of play, the annular disc forming the abutment part relative to the other two annular discs or annular segments and consequently relative to the first device or flywheel element.

If appropriate, however, it is also possible to have an arrangement in which the distance between the edges is greater, so that the spring effect provided by the helical compression springs is exerted only after a certain play between the abutment part and the associated flywheel element has been used up.

Is is expedient to arrange the helical compression springs in regions of the flywheel elements near the periphery so that, if appropriate, high torques can be transmitted even with relatively weak helical compression springs or those with a relatively low prestress.

The two annular discs or annular segments arranged on one of the flywheel elements can be clamped axially against the further annular disc forming the abutment part, with friction elements or friction lamellae being interposed, in order to form the non-positive first coupling which is inserted parallel to the helical compression springs forming the further spring mounting. In this arrangement, virtually no additional parts are therefore required for the said coupling.

In an especially preferred, independently inventive design of the device described above, the play of the coupling subject to play is limited resiliently at least in one direction of rotation of the flywheel elements relative to one another. This resilient limitation is provided particularly for that relative direction of rotation which occurs between flywheel elements in response to increased deceleration.

The benefit of such an arrangement is that the damping caused by the coupling subject to play takes effect without a torque jump. In particular, when the play of the coupling subject to play is used up to an increasing extent, an element limiting the play resiliently is first tensioned increasingly, until the coupling subject to play is activated and yields at a sufficient torque. Thus, resilient limitation of the play prevents the relative movement between the flywheel element from stopping abruptly, when the torques exerted between the elements on the one hand are sufficiently high to use up the play, but on the other hand do not exceed the non-positive connection of the coupling subject to play.

The arrangement of the coupling subject to play can be such that it has at least one annular lamella which is arranged on the first flywheel element with play in the peripheral direction and interacts with friction surfaces, friction lamellae or the like arranged on the other flywheel element, and which cooperates with one or more springs which are supported on the first flywheel element or on a part connected to the latter and are activated only after the play has been partially used up.

For this purpose, resilient pins can be arranged on one of the flywheel elements and engage with play recesses extending in the annular lamella tangentially relative to the axis of the annular lamella.

For this, the pins appropriately have a fixed core and a ring which is arranged on the latter with elastomeric material interposed and which engages into a particular one of the recesses.

If appropriate, extensions, bolts or the like can be arranged on the annular lamella or on one of the flywheel elements and, after the play has been partially used up, come up against a spring supported or arranged on the one flywheel element or the annular lamella, for example against a bow spring. If appropriate, the spring end interacting with the extension or the like can have a slot or the like surrounding the extension or the like and arranged tangentially relative to the axis of the annular lamella.

A further preferred embodiment is characterized in that the annular lamella is arranged axially between annular discs or annular segments which are arranged on one of the flywheel elements and which retain in a cage-like manner, by means of apertures or the like provided in the discs or segments, helical springs or the like arranged between these discs or segments tangentially relative to the disc axis. The annular lamella includes cut-outs surrounding the end faces of the helical springs by means of radial edges, the distance between which is greater than the length of the above-mentioned apertures or the like in the peripheral direction.

Thus, if appropriate, according to the difference between the distances between the radial edges and the length of the apertures of the like, the annular lamella can move, without the helical springs seeking to counteract the movement of the annular lamella.

Other objects, advantages and novel features of the present invention will become apparent from the following detailed description of the invention when considered in conjunction with the accompanying drawings.

BRIEF DESCRIPTION OF THE DRAWINGS

FIG. 3A and 3B show alternative embodiments of a bow spring according to the principles of the present invention.

DETAILED DESCRIPTION OF THE DRAWINGS

Figure 1:
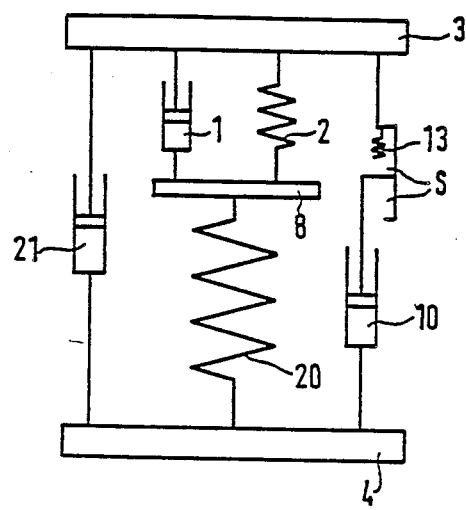
FIG. 1 shows a diagrammatic representation of a split flywheel according to the invention.

FIG. 1 illustrates each of the two flywheel elements 3 and 4 diagrammatically and as heavy bodies which are supported or coupled relative to one another by means of a spring mounting 20. The spring mounting 20 is supported on the one hand directly on the flywheel element 4 or a part (not shown) connected to the flywheel element 4 and on the other hand on an abutment part 8. The abutment part 8 is connected to the other flywheel element 3, via a further spring mounting 2, with a relatively high prestress and a non-positive coupling 1 parallel to this. The non-positive connection of the coupling 1 and the tension of the further spring mounting 2 are calculated so that the abutment part 8 can move relative to the flywheel element 3 only when the flywheel elements 3 and 4 have executed a greater relative movement in relation to one another in one direction or the other, and at the same time increasing the tension of the spring mounting 20.

Furthermore, between the flywheel elements 3 and 4 there is arranged a further coupling 10 subject to play, which is activated only when a play S present in the connection between this coupling 10 and the first flywheel element 3 is used up. This play is limited elastically by means of spring 13 in one direction.

Finally, an additional coupling 21 with a relatively low non-positive connection effective in response to all relative movements between the flywheel elements 3 and 4 can also be provided between the flywheel elements 3 and 4.

Figure 2:
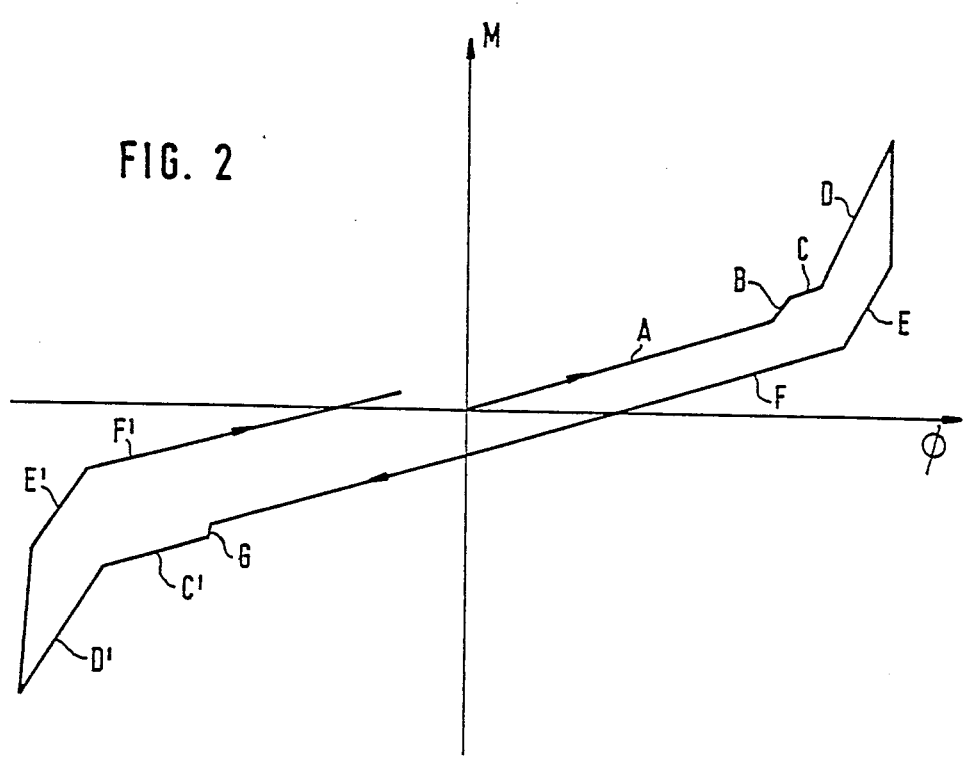
FIG. 2 shows a diagram to explain the dependence of the torques (M) exerted between the flywheel parts or to be overcome, as a function of the relative deflection ($\phi$) of the flywheel parts relative to one another.

The mode of operation of the arrangement illustrated diagrammatically in FIG. 1 is evident from FIG. 2.

First, the flywheel elements 3 and 4 move relative to one another out of the position shown in FIG. 1, say in the direction corresponding in FIG. 1 to an approach between the flywheel elements 3 and 4. If the influence of the additional coupling 21 is ignored, only the spring mounting 20 is first tensioned increasingly according to the segment A, that is to say the relative rotation $\phi$ increases according to the increasing torque M. As soon as the play S is used up to such an extent that the spring 13 takes effect, a torque M increasing more sharply must take effect to ensure further rotation according to the segment B. As soon as the tension of the spring 13 corresponds to the non-positive connection of the coupling 10, the torque M required for further relative rotation increases according to the segment C, until the spring 20 is tensioned so that the abutment part 8 can move relative to the flywheel element 3. The coupling 1 and the spring mounting 2 are now activated, that is to say to ensure a further relative movement between the flywheel elements 2 and 3 the torque M must rise steeply according to the segment D.

As soon as the torque M exerted has decreased sufficiently, the flywheel elements 3 and 4 are returned according to the curved segment E which is offset laterally relative to the segment D, the amount of offset being determined essentially by the non-positive connection of the coupling 1 (hysteresis effect). As soon as the spring 2 has relaxed as far as possible, that is to say can no longer push the abutment part further back relative to the flywheel element 3, the spring mounting 20 relaxes according to the segment F. When the flywheel elements 3 and 4 are further rotated relative to one another, the play S is used up in the opposite direction. Since there is no resilient play limitation in this direction of the relative movement of the flywheel elements 3 and 4, the torque M rises abruptly according to the segment G.

The conditions represented by the segments C' and D' then apply to a further relative movement of the flywheel elements 3 and 4; these latter segments correspond very closely to the segments C and D, with the exception of the direction.

The same applies accordingly to the segments E' and F' representing a reversal of direction as to the segments E and F.

Figure 3:
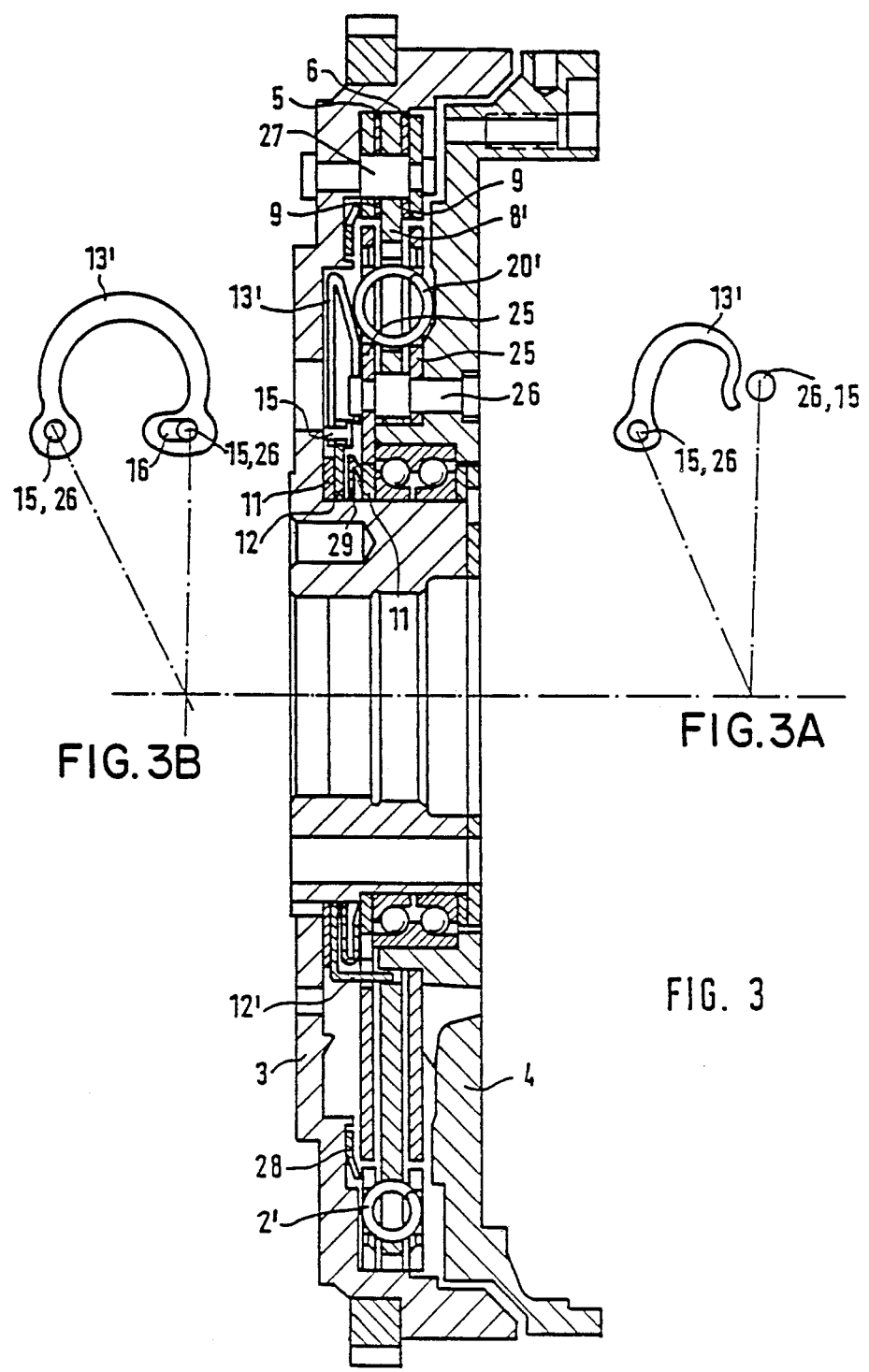
FIG. 3 shows an axial section through a first embodiment of the present invention.

According to FIG. 3, the split flywheel element consists of the flywheel elements 3 and 4. The latter element 4 is mounted so as to be radially and axially immovable, but rotatable on an axial extension of the first flywheel element 3, with grooved ball bearings interposed. Between the flywheel elements 3 and 4 there is an annular space which receives elements connecting the flywheel elements 3 and 4 to one another in drive terms.

For this purpose, annular discs 25 are arranged on the flywheel element 4 at an axial distance from one another by means of bolts 26 which fix the annular discs 25 non-rotatably relative to the flywheel element 4. The annular discs 25 have several apertures which are arranged approximately tangentially relative to the disc axis and which helical springs 20', corresponding to the spring mounting 20 in FIG. 1, are arranged in a cage-like manner. An annular disc 8' forming the abutment part 8 of FIG. 1 is arranged between the annular discs 25 so as to be rotatable relative to the latter. Like the discs 25, the annular disc 8' has apertures for receiving the helical springs 20'. Thus, when the annular disc 8' is rotated relative to the annular discs 25, the helical springs 20' are subjected to increasing compression between opposing radial edges of the apertures in the annular discs 25 on the one hand and the annular disc 8' on the other hand. At the same time, the relative moveability of the annular disk 8' relative to the annular disc 25 can be limited because the annular disc 8' surrounds the bolts 26 with play in the peripheral direction. If the moveability of the annular disc 8' is not limited as a result of the interaction with the bolts 26, the moveability is nevertheless limited because the helical springs 20' bar further movement as soon as they are compressed into a block.

The annular disc 8' is arranged with its radially outer region between annular discs 5 and 6 which are fastened non-rotatably to the flywheel element 3 by means of bolts 27. At the same time, the annular disc 5 is clamped axially in the direction of the other annular disc 6 by a spring ring 28, such that a non-positive connection reinforced by friction lamellae 9 is guaranteed between the annular discs 5 and 6 on the one hand and the annular disc 8' on the other hand. So that the annular disc 8' is movable relative to the annular discs 5 and 6 against the resistance of the said non-positive connection, recesses are provided in the annular disc 8' in the region of the bolts 27 and guarantee the desired rotatability and on the other hand limit it in interaction with the bolts 27.

Also arranged in the annular discs 5 and 6 are apertures which extend tangentially relative to the axis of the annular discs and which receive, in a cage-like manner, helical compression springs 2', preferably without prestress. Corresponding apertures are also provided in the annular disc 8' so that the said helical compression springs 2' are subjected to compression when the annular disc 8' rotates in one direction or the other relative to the annular discs 5 and 6. In certain preferred embodiments, the springs 21 are arranged with a prestress which is preferably below the maximum engine torque.

The helical compression springs 2', which seek to force the annular disc 8' into a center position in the peripheral direction relative to the flywheel part 3, form the spring mounting 2 in FIG. 1, while the annular discs 5 and 6 and the annular disc 8', together with the interposed friction lamellae 8, correspond to the coupling 1 in FIG. 1.

To form the coupling 10 subject to play in FIG. 1, an annular lamella 12 is arranged rotatably relative to the flywheel element 3. This annular lamella 12 engages by means of angled axial extensions 12', orifices in one of the annular discs 25. These orifices surround the extensions 12' with play in the peripheral direction, such that the annular lamella 12 can move according to the play S in FIG. 1 in relation to the annular discs 25 or the flywheel element 4 connected non-rotatably to them. The annular lamella 12 is clamped non-positively between friction lamellae 11 which, stressed axially by a spring ring 29, are arranged on the flywheel element 3.

Arranged on the annular lamella 12 are bolts 15 which, in the event of sufficient rotation of the annular lamella 12 relative to the annular discs 25 or the flywheel element 4, come up against one leg of a U-shaped bow spring 13', the other end of which is connected firmly to the flywheel element 4, for example by the bolts 26. Thus, the bow springs 13' form a resilient stop, when the annular lamella 12 moves in one direction of rotation relative to the flywheel element 4, at the same time partially using up its play S (see FIG. 1).

As illustrated in FIG. 3A, the bow spring 13' can also be connected fixedly at one end to the annular lamella 12, the other free and in each case interacting with one of the bolts 26, i.e. resting against the bolts 26 under the tension of the bow spring 13' when the annular lamella 12 is moved relative to the flywheel element 4, at the same time partially using up its play S (see FIG. 1).

Moreover, as illustrated in FIG. 3b, a slot 16 arranged tangentially relative to the flywheel axis can be provided in the free end of the bow spring 13' and surrounds, with play in the peripheral direction of the flywheel, the facing end of one of the bolts 26, when the bow spring 13' is arranged on the annular lamella 12, or one of the bolts 15 on the annular lamella 12, when the bow spring 13 is arranged on the flywheel element 4. In this arrangement, the bow spring 13' can take effect in both possible directions of rotation of the annular lamella 12 relative to the flywheel element 4 in the event of a sufficiently large relative deflection.

Figure 4:
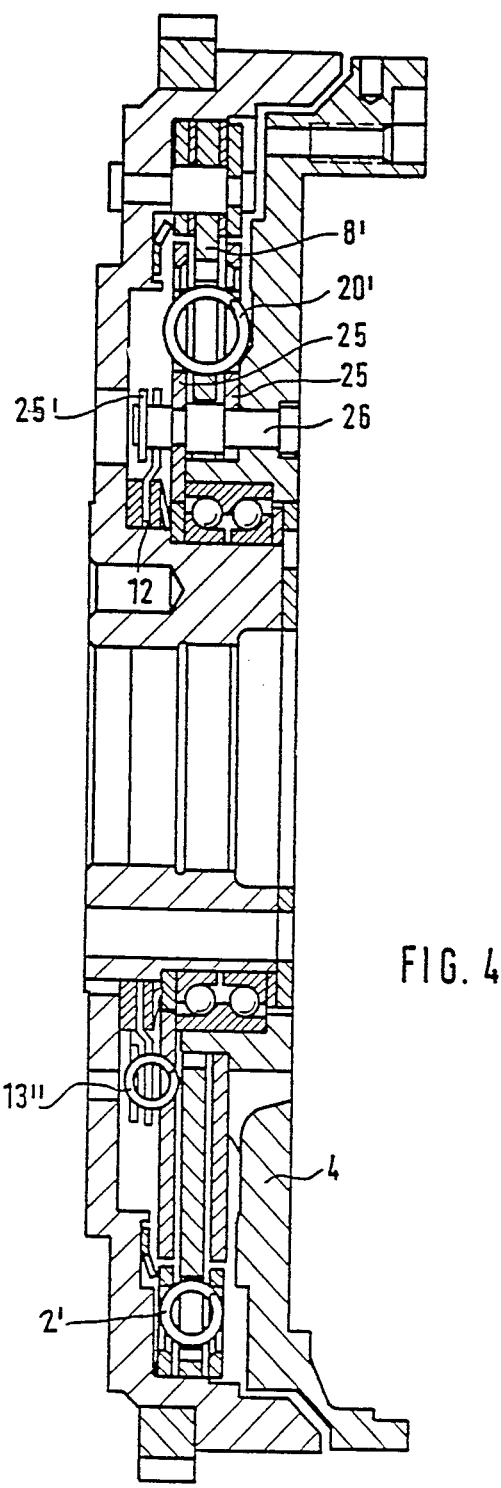
FIG. 4 shows a corresponding axial section through a second embodiment of the present invention.

The embodiment according to FIG. 4 corresponds essentially to the embodiment according to FIG. 3.

In contrast to FIG. 3, the annular lamella 12 has on its outer periphery radial extensions or corresponding radial cut-outs which interact with the bolts 26 and which limit the rotatability of the annular lamella 12 relative to the flywheel element 4 according to the play S in FIG. 1. Furthermore, the bolts 26 retain an additional annular disc 25' or disc segments on the side of the annular lamella 12 facing away from the annular discs 25. The annular disc 25' or the disc segments and the adjacent disc 25 possess apertures which are arranged tangentially relative to the flywheel axis and which receive helical springs 13" in a cage-like manner.

Similar apertures, with a greater extension in the tangential direction, are arranged in the annular lamella 12. As soon as the annular lamella 12 is rotated far enough relative to the flywheel element 4, the helical springs 13" are subjected to increasing compression. At the same time, if appropriate, the movability of the annular lamella 12 can be limited as a result of interaction with the bolts 26 such that the spring effect of the helical springs 13" is exerted only in one direction of rotation of the annular lamella 12 relative to the flywheel element 4.

Figure 5:
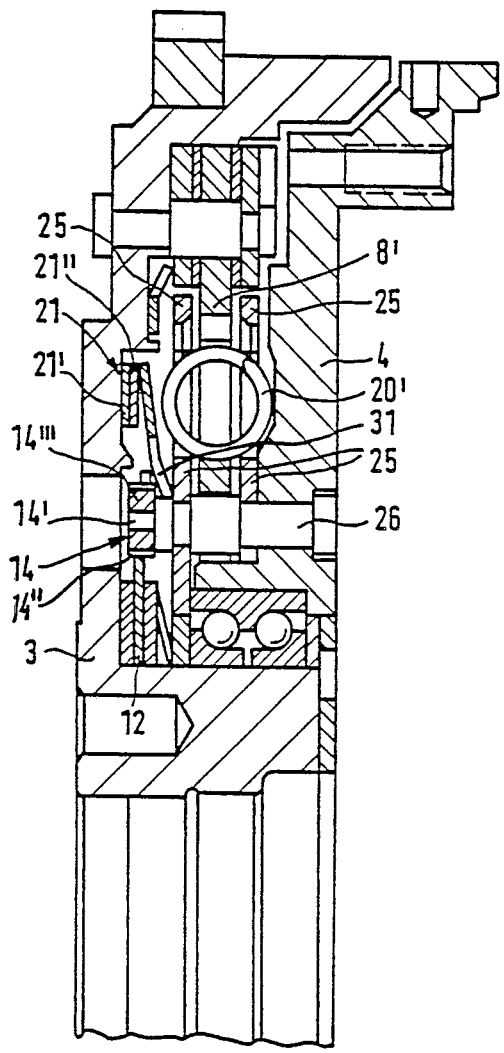
FIG. 5 shows an axial section through a third embodiment of the present invention.

In the embodiment according to FIG. 5, the annular lamella 12 has on its outer periphery recesses, which surround pins 14, arranged on the bolts 26, with play in the peripheral direction of the flywheel. The pins 14 each have a core 14' which is connected fixedly to the bolts 26 and on which a ring 14" is arranged resiliently, with an elastomer material 14''' interposed. This ring 14" interacts with the above-mentioned recesses in the annular lamella 12, such that the movability of the lamella 12 relative to the flywheel part 4 is limited resiliently.

Moreover, FIG. 5 also shows an example of the coupling 21 (see also FIG. 1). This consists essentially of a friction lamella 21' resting on the flywheel part 3 and interacting with an annular lamella 21" which is clamped axially against the flywheel part 3 by means of a spring ring 31. The spring ring 31 is supported on the adjacent disc 25 and is mounted on the bolts 26 so as to be non-rotatable relative to the flywheel part 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for reducing engine-excited vibrations of a drive train including a split flywheel having first and second flywheel elements which are arranged equiaxially relative to one another and one of which is connected to an engine and the other to a drive train, a spring mounting driveably connecting the flywheel elements to one another and connected at least to the first flywheel element via a first non-positive coupling inserted between an abutment element of the spring mounting and the first flywheel element, and a second non-positive coupling subject to play and connected in parallel to the spring mounting between the first and second flywheel elements, the second non-positive coupling having a non-positive connection reduced in comparison with the first coupling, and further comprising:

a second spring mounting in parallel to the first coupling and disposed without play between said first flywheel element and said abutment element.

2. A device according to claim 1, wherein:

in two radial planes axially spaced from one another, first and second annular discs mount on said first element between the first and second flywheel elements;

apertures in the discs which approximately coincide and extend tangentially relative to the disc axis;

said second spring mounting includes helical compression springs arranged tangentially between the annular discs in said apertures; and said abutment element includes a third annular disc axially between and rotatable relative to said first and second annular discs and including cut-outs which surround the end faces of the helical compression springs.

3. A device according to claim 2, wherein the edges of the cut-out surrounding the end faces are, in the peripheral direction of the third disc, at a distance from one another corresponding to the lengths of the apertures in this direction.

4. A device according to claim 2, wherein the helical compression springs are arranged in the region of the flywheel elements which is near the periphery.

5. A device according to claim 2, wherein said first non-positive coupling includes friction lamellae interposed between said first and second annular discs and said third annular disc which are axially clamped.

6. A device according to claim 1, wherein the non-positive connection of the first coupling is below the maximum engine torque.

7. A device according to claim 1, wherein the tension of the second spring mounting arranged parallel to the first coupling reaches a value corresponding to the maximum engine torque only after the maximum spring excursion has been partially used up.

8. A device according to claim 1, wherein the second spring mounting inserted parallel to the first coupling is arranged without prestress.

9. A device according to claim 1, wherein the second spring mounting inserted parallel to the first coupling is arranged with a prestress which is preferably below the maximum engine torque.

* * * * *